3,438,131
APPARATUS FOR SEPARATING WHEY FROM CURD AND DISCHARGING IT INTO MOLDS
Jacob Ubbels and Hermannes Jan Staal, Ede, Netherlands, assignors to Bedrijven Van Het Nederlands Instituut voor Zuivelonderzoek, Ede, Netherlands
Filed Apr. 10, 1967, Ser. No. 629,647
Claims priority, application Netherlands, Apr. 12, 1966, 6604863
Int. Cl. A01j 25/11, 27/00
U.S. Cl. 31—46
8 Claims

ABSTRACT OF THE DISCLOSURE

In continuous cheese making the clogging of the perforations by curd in a column for separating whey from the curd, through which perforations the whey leaves the column, is prevented by closing the discharge, through which whey flowing through the perforations is allowed to be discharged, so that this whey discharge is fully closed at the moment, at which the curd mass in the column, moving downwards from the column into a cheese mold, reaches the bottom of the mold. At this moment the curd mass imparts upon the bottom of the mold and gives an impact or kind of pressure wave upwardly through the curd and whey mass in the column. By having said whey discharge closed at said moment no curd is entrained by the whey notwithstanding this pressure wave and thus the perforations are not clogged by curd particles.

Figure 1:
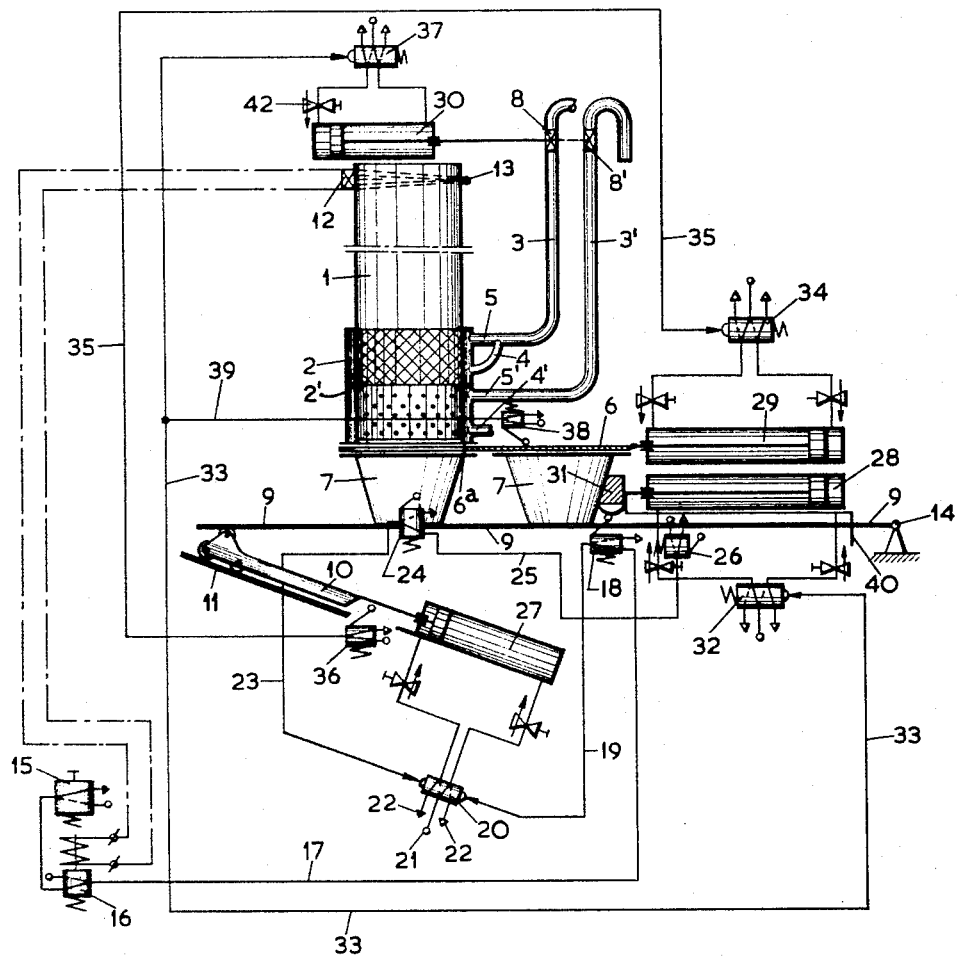

The invention relates both to a process and to a device for realizing this closing of the whey discharge at the correct moment by coupling the whey discharge closing means to the means for opening and closing the lower end of the said column towards a cheese mold below it.

---

The invention relates to a process for the filling of curd into cheese molds or provisional molds by means of a delivery device, which comprises an at least partly perforated molding column with means for closing it at the lower end, with one or more surrounding receiving chambers for whey leaving the column via the perforations and with one or more discharge pipes for whey from said receiving chamber(s), which are so designed or adjusted that the receiving chambers (a receiving chamber) can be filled completely with whey, and to a delivery device for curd, adapted for carrying out this process.

Such a process and device are known in various forms. They invariably involved difficulties of various kinds. If the whey is allowed to flow off in such a way that the curd is dried up, this has an adverse influence on the quality of the cheese. If the curd is always kept submerged beneath the liquid surface in the column, for instance by guiding they whey upwards from the said discharge pipe(s), so that a whey column is maintained, the perforations in the lower part of the column will repeatedly become clogged by curd.

It is the object of the invention to improve this situation, and to achieve this a process as referred to in the above preamble has been developed, which according to the invention is characterized in that during or shortly before the opening of the means for closing the molding column at the lower end with a view to filling a cheese mold or provisional mold the discharge pipe(s) for the whey from the receiving chamber(s) is (are) closed, so that no whey can flow through the perforations any more, but is (are) opened again when the mold has been filled.

It has surprisingly appeared that, if this method is followed, no clogging of the perforations is found to occur. This is probably due to the fact that, unlike according to the method in which the curd is dried up, the greatest risk of clogging occurs at the moment when the curd column, while descending into the cheese mold, reaches its bottom and is accordingly stopped abruptly. At this moment a pressure impulse is produced, which strongly forces the curd into the perforations when the whey discharge pipe(s) is (are) opened. Upon application of the invention the curd can stay sufficiently submerged beneath the whey surface without the whey flowing off forcing the curd into the perforations and without the curd being delivered in too wet a condition.

A delivery device for the application of the process in question is characterized according to the invention in that the shut-off device in one or more pipes for the discharge of the whey from the receiving chamber(s) is (are) coupled directly or indirectly for operation with the shutoff device for closing the opening through which the curd leaves the column to be delivered to a cheese mold.

Figure 2:
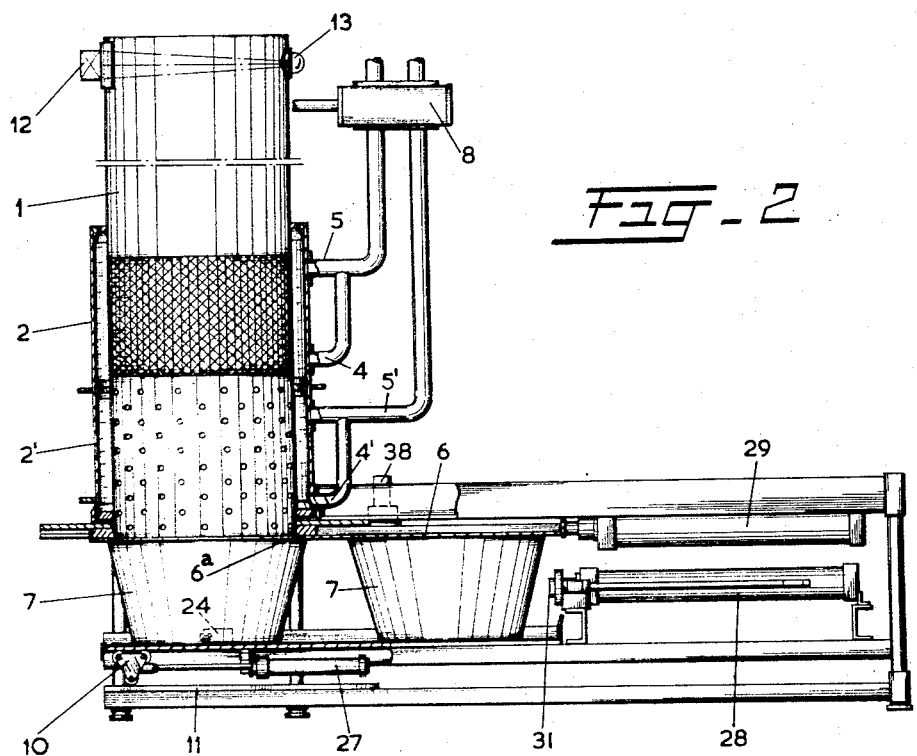
Figure 3:
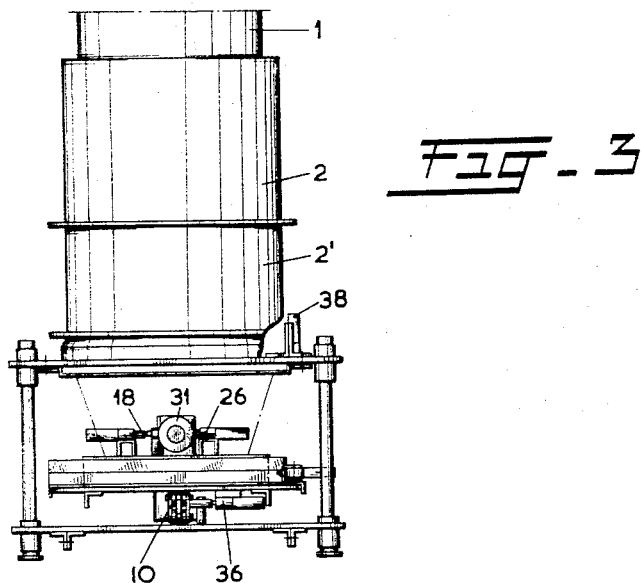

The invention will now be explained with reference to the enclosed drawings, illustrating a preferred embodiment of the device according to this invention, and showing:

In FIG. 1 in part diagrammatically and in vertical elevation and section of this device;

In FIG. 2 the separating column with surrounding parts on a larger scale and more structurally detailed, with the control system omitted, viz. in a vertical elevation and section; and In FIG. 3 a view from the right end of the device as shown in FIGURE 2.

A vertical molding column 1 is positioned adjacent to a curd-producing device, in which the milk has been curdled, the curd has been cut, etc., as known per se. The mixture of whey and curd leaving this device is fed into the open top of the molding column 1, while a desired quantity of hot water or hot whey may be added. At the lower end of this molding column the wall of the column 1 is perforated, while it is surrounded by a casing 2 for receiving whey. In the embodiment shown in the drawing this casing has been divided into two sections 2 and 2', one above the other, each with its own whey discharge pipe 3 and 3', respectively. The whey discharge pipes 3 and 3' are connected in two places with the sections of the casing 2 and 2', viz. at a higher level by a pipe connection 5 and 5' and at a lower level by a pipe connection 4 and 4'. Through the upper discharge pipe connections 5 and 5' the air can escape from the sections of the casing 2 and 2'; through the lower discharge pipe connections 4 and 4' any rapidly settling curd dust entrained with the whey is discharged. It is preferable to position the perforations in the upper section 2 very closely together, so that a large part, e.g. 50%, of the total surface is perforated, and to provide in the lower section 2' only a relatively small number of small openings, e.g. circular openings with a diameter of 0.5 to 1.5 mm. (the perforations forming for instance 0.2% of the surface) in a jacket of stainless steel or a similar corrosion-proof metal. In consequence of this, the upper section is able to discharge the greater part of the whey and the wall in the lower section is more smooth, so that the curd will show less tendency to stick to the wall and sag in the center when the opening at the lower end of the molding column is cleared, while nevertheless a very small quantity of whey, which could be pushed out from between the curd particles in the lower part of the column, can flow off through the small perforations therein.

At the lower end of the molding column 1 the latter is open, and this opening can be closed by a slide valve 6. One edge of the circular opening therein has the form of a cutting edge 6a. Placed underneath the column is a cheese mold 7, which may be the definitive mold or a a provisional, preliminary mold.

Fitted in the upwardly directed whey discharge pipes 3 and 3' are closing valves 8 and 8'. These may be opened or closed, and, if desired, they themselves may be manually adjustable in intermediate positions, i.e. they may be throttled more or less, or additional valves may be provided, which are manually adjusted in intermediate position, while the valves 8 and 8' may only be fully opened or entirely closed. Above the valves the whey discharge pipes have free overflows.

The cheese molds 7 are placed on a table 9, adapted to move up and down a short distance because this table is able to pivot about a pivot 14 and because a slide 10 has been provided, which is adapted to move to and fro between the table 9 and an inclined lower guide 11. The inclination of this lower guide has been greatly exaggerated in the drawing.

A higher part of the column 1 may be made of glass, or of a suitable transparent synthetic material, or may be fitted with gauges. It is thus possible to check visually whether the device is operating properly and how high is the level of whey and curd in the molding column. In this zone a photo-electric cell 12 may also be provided, which receives light from a light-source 13 and which thus checks whether a sufficient quantity of curd has accumulated in the column for a cheese mold 7 to be filled therewith.

For the operation of the delivery device described above a hydraulic, pneumatic, or electric circuit system can be used. The embodiment shown in the drawing is a pneumatic system. This system comprises a manually operated valve 15 and an electromagnetic valve 16 operated by the photo-electric cell 12, both valves being connected in series with a conduit 17 as shown. In the position of the drawing the members 15 and 16 are both so placed that the conduit 17 is deenergized. The conduit 17 leads to a valve 18 and from this valve a conduit 19 leads to the valve operating side of a valve 20 with a central air supply connection 21 and two air vents 22 for the operation of a pneumatic cylinder 27 as known per se. The valve of the device 20 can be controlled at the other end by air from a conduit 23, connected with a valve 24, with which is connected a conduit 25, leading to a valve 26.

There are four pneumatic cylinders 27, 28, 29, and 30. The cylinder 27 operates the slide 10 for the slight up or down movement of the table 9 on which the cheese molds 7 are mounted.

The cylinder 28 operates a pusher 31 for advancing cheese molds 7 on the table 9, said pusher 31 operating the valve 18, while the cylinder 28 itself is operated by air controlled by a valve 32, which is adjusted by air in the conduit 33.

The cylinder 29 operates the slide valve 6 for closing and opening the lower end of the column 1 and is operated in turn by air controlled by a valve 34. The latter can be adjusted by air pressure in the conduit 35, which is connected at the other end with a valve 36, operated by the slide 10.

The cylinder 30 is operated by air controlled by the valve 37, which can be operated by pressure in the conduit 33. A valve 38 is operated by the slide valve 6 and influences the pressure in the conduit 39, which is connected with the conduit 33. In fact, this valve 38 has a feeler, which is kept raised by the slide valve when the latter is in the opened position, but drops when the slide valve reaches the closed position.

Connected with the piston rod of the cylinder 28 is a projecting control member 40, which operates the valve 26.

A variety of known aids for such a pneumatic system have been incorporated, which need not be described in detail as these are well known.

The valve 20 is operated in both directions by air pressure on the end faces of a valve piston, from duct 19 or 23. Valves 32, 34 and 37 are operated by air pressure on one side and urged back by a spring as shown on the other side. The feeler operated valves 18, 24, 26, 36 and 38 have spring-urged feelers to urge the feelers outwardly.

The cylinders 27, 28 and 29 have throttling valves in their supply conduits allowing the air to flow freely into said cylinders but throttling the air when flowing out of the cylinders. Cylinder 30 has such a throttling valve, indicated by 42, in the left conduit only and throttling the outflow only.

The small circles at the several valves indicate supply of air under pressure, the small triangles indicate free discharge of air.

The present device operates as follows: Imagine that in an initial position the slide valve 6 keeps the column 1 open and that the whey discharges 3 have open valves 8, being the position of parts as shown in the drawing.

When it has been determined, either by visual observation or in some other way, that a sufficient quantity of curd has accumulated in the molding column, the valve 15 can be operated manually, in consequence of which air under pressure is admitted into the circuit 17. This switching action can instead be effected by the photo-electric cell 12, which then operates the valve 16 with the valve 15 present in the air admitting position. When the air is in the conduit 17 is put under pressure, air pressure will also act via the valve 18 and the conduit 19 on the valve 20. The latter is reversed so that air under pressure is admitted to the left of the piston in cylinder 27, in consequence of which the slide 10 is retracted and thus also moves slightly downwards, so that the table 9 descends a little, while pivoting about the pivot 14. In this way the cheese mold 7 placed on the table 9 and previously forced against the lower end of the slide valve 6 is moved slightly downwards. This slide valve thus becomes free to move between the cheese mold 7 and the lower end of the column 1. Under the influence of the valve 36, which is operated by the slide 10 as the latter is retracted, air under pressure enters the conduit 35 and this air reverses the valve 34, which controls the cylinder 29. In consequence, the piston of this cylinder 29 moves the slide valve 6 to the left in the FIG. 1, as a result of which the molding column is closed at the lower end. The blade-shaped cutting edge 6a cuts the curd column sharply during this closing movement. As soon as the slide valve 6 reaches the closed position, the valve 38 is reversed, so that air under pressure enters the conduit 33 via the conduit 39. In consequence, two things happen. In the first place the valve 32 is reversed, as a result of which the cylinder 28 is energized and the pusher 31 therefore pushes an empty cheese mold 7 underneath the lower end of the column 1 across the table 9 and at the same time pushes the filled mold 7 from underneath the column. As soon as the pusher 31 leaves the valve 18, the latter vents air from the conduit 19, in consequence of which the value 20 can be reversed as soon as the conduit 23 is energized. In the second place the valve 37 is reversed by the spring on this valve, as a result of which the cylinder 30 is energized and the valves 8 in the whey discharge pipes are closed. When the pusher 31 arrives at the end of its path, the stop 40 drawn along by it will operate the valve 26. Thus air under pressure enters the conduit 25. The valve 24 reacts to the presence of a mold 7 underneath the column 1 by cooperating with a side wall part thereof, and if a mold 7 is present here, the valve 24 is in the position in which it transmits the air pressure from the conduit 25 to the conduit 23 and thus to the valve 20, as a result of which the latter is returned to its initial position shown in the drawing. In consequence, the cylinder 27 is energized to push back the slide 10 and thus to raise the table 9 again. During the early part of this returning movement of the slide 10, i.e. in the upward movement in the drawing, the valve 36 returns by spring action to its initial position, in consequence of which the conduit 35 is deenergized, the valve 34 returns to its initial position by spring action, and thus the slide valve 6 is retracted. All this is governed in mutual time-relationship by the incorporation of suitable throttling elements in the pneumatic conduits to the cylinders 27, 28 and 29 as mentioned above, in such a way that the table 9 raises the empty cheese mold 7 underneath the column so slowly or so late that the slide valve 6 has reached the fully opened position when the mold 7, when moving upwards, comes into contact with it.

Owing to the returning movement of the slide valve 6 the valve 38 is operated again to move to the position shown in the drawing, in such a way that this valve deenergizes the conduit 39, and thus also the conduit 33. In consequence the piston in cylinder 28 is retracted, and accordingly so is the pusher 31. The cylinder 30 is also switched, but through the presence of the throttling element 42 this takes place so slowly that the whey discharge pipes are opened with some retardation (delay). This means that the means of curd, dropping from the column 1 as soon as the slide valve 6 quickly opens, reaches the bottom of the cheese mold 7 at a moment at which the valves 8 in the whey discharge pipes 3 are still closed. The pressure impulse produced as the falling curd mass is stopped at the bottom of the mold cannot now clog the perforations in the lower part of the column with curd. The valves 8 are now slowly opened. Thus a separation of whey and curd takes place again, the whey flowing off for a considerable time through the discharge pipes 3 and the curd in the lower part of the column tending to be compacted more closely. The latter is also the case, though to a much smaller extent, in the cheese mold; here some whey may escape through holes in the wall of the cheese mold, known as such. The filling of a mold, including some compacting of the curd in the mold, in all takes a considerably longer time than closing the column 1 and keeping it closed with the slide valve 6 and replacing the molds 7. On this account it is justified in practice to close the whey discharge pipes as soon as the slide valve 6 closes the column, and to open them with some time lag or delay as soon as the slide valve starts to move towards the opened position again. The division of the periods, however, might also be different, e.g. in case of a relatively slow feed of curd (small quantities per unit time) to the column 1. In that case the whey discharge pipes should be kept open during almost the full closing time of the column 1 and closed only when the column is opened by the slide valve 6. During an experimental application of the device according to the invention the column was regularly kept open for longer than 1.5 minutes and kept closed for shorter than 0.5 minute. It is obvious that the essence of the invention resides in the interruption of the whey discharge through the perforations in the wall of the molding column 1 to the casing(s) 2 at the moment at which the column of curd drops into the cheese mold and a pressure impulse occurs in the mass of whey and curd in the molding column. Also if the mold is filled in a different way from that in the example given, e.g. by only opening the molding column for a moment in order to fill the mold without keeping it open for further compacting of curd and separation of whey, the method described for preventing the clogging of the perforations during the fall of the column can be applied to advantage.

In FIGURES 2 and 3 it is shown that the angle between the table 9 and the inclined lower guide is very small. It was exaggerated considerably in FIGURE 1 for sake of clarity. This angle could be 1° 10′ as appeared sufficient in practice.

In the upper perforated part of column 1 in the upper section of casing 2 the inclined intersecting lines are intended to indicate that there are small perforations one at each intersection between these lines.

Having described our invention, we claim:

1. An apparatus for filling of curd into cheese molds comprising a vertical molding column perforated about at least a lower portion thereof, movable means closing the bottom of said column, means for selectively opening and closing said closure means, at least one receiving chamber surrounding the perforated portion of said column for receiving whey leaving the column from said perforations, at least one discharge pipe for removing said whey from said receiving chambers, means in said discharge pipes for adjusting the flow of whey from the receiving chambers, means for positioning cheese molds below the bottom of said column, and means for closing said discharge pipes and opening the closure means at the bottom end of said column so that said column will discharge its contents into said mold, said discharge pipes being reopened when the mold has been filled.

2. A separating and delivering apparatus for separating whey from curd and for delivering the curd to cheese molds during cheese making comprising a substantially vertical molding column having perforations in at least a lower portion and slide valve means at the bottom end thereof, at least one receiving chamber surrounding the perforated portion of said column for receiving whey leaving the column via the perforations, at least one discharge pipe connected to said chamber for discharging the whey therefrom, said discharge pipe including valve means to control the flow therethrough whereby the receiving chambers can be filled completely with whey, and coupling means for coupling the slide valve means to the valve means in the whey discharge pipes so as to entrain the closing of the whey discharge pipe and opening the slide valve at the lower end of the molding column.

3. A separating and delivering apparatus according to claim 2 further comprising means for sensing an adequate level of curd in the column, control means responsive to said sensing means and operatively connected for controlling operation of means for moving a cheese mold underneath the molding column, means for sensing the presence of said mold, a further control means responsive to said mold position sensing means for controlling said slide valve means of said column, and a third control means responsive to the movement of said slide valve means and closing the valves in the whey discharge pipes, a throttling device operatively connected for opening the valves in the whey discharge pipes after a time lag allowing said slide valve means to clear the column.

4. A separating and delivering apparatus according to claim 2, in which the lower end of said column is surrounded by at least two whey receiving chambers, said chambers being vertically positioned adjacent each other, a discharge pipe connected to each said chamber, valve means for closing each said discharge pipe, said valve means being coupled mechanically so as to simultaneously open and close.

5. A separating and delivering apparatus according to claim 2 in which said whey receiving chamber around the lower end of said column has at least two whey discharge orifices vertically spaced near the upper and lower ends of said chamber.

6. A separating and delivering apparatus according to claim 2 in which said coupling means couples the slide valve means to the valve means for closing the whey discharge pipes so as to entrain the closing of the whey discharge pipe during opening of said slide valve, said whey discharge pipe extending upwardly from said whey receiving chamber so as to maintain in operation a column of whey around and above the perforations in said column.

7. A separating and delivery apparatus according to claim 4 in which said column is less perforated in that portion surrounded by the lower whey receiving chamber thus assuring a smoother flow of the curd in said lower receiving chamber.

8. A separating and delivery apparatus according to claim 2 in which said means for positioning said molds comprises table means movably mounted beneath said column for imparting a vertical movement to said molds and means responsive to the movement of said table means for controlling said column closure means and said discharge pipe closure means.

References Cited

UNITED STATES PATENTS

| | | | |
|---|---|---|---|
| 2,781,269 | 2/1957 | Harper et al. | 99—116 |
| 2,851,776 | 9/1958 | Czulak et al. | 31—46 |
| 2,917,827 | 12/1959 | Lankford | 31—46 |
| 3,032,877 | 5/1962 | Collins | 31—46 |
| 3,142,904 | 8/1964 | De Boer | 31—13 |
| 3,217,411 | 11/1965 | De Boer | 31—46 |
| 3,242,571 | 3/1966 | Langford | 31—44 |

ALDRICH F. MEDBERY, *Primary Examiner.*

U.S. Cl. X.R.

99—116; 31—89